United States Patent
Takahashi et al.

(10) Patent No.: US 9,694,683 B2
(45) Date of Patent: Jul. 4, 2017

(54) MIXER DRUM DRIVING APPARATUS

(75) Inventors: Yoshimitsu Takahashi, Fukaya (JP); Kazunori Tanaka, Fukaya (JP)

(73) Assignee: KYB Corporation, Tokyo (JP)

( * ) Notice: Subject to any disclaimer, the term of this patent is extended or adjusted under 35 U.S.C. 154(b) by 473 days.

(21) Appl. No.: 14/006,791

(22) PCT Filed: Mar. 12, 2012

(86) PCT No.: PCT/JP2012/056238
§ 371 (c)(1),
(2), (4) Date: Sep. 23, 2013

(87) PCT Pub. No.: WO2012/128092
PCT Pub. Date: Sep. 27, 2012

(65) Prior Publication Data
US 2014/0015315 A1    Jan. 16, 2014

(30) Foreign Application Priority Data
Mar. 24, 2011   (JP) ................. 2011-065505

(51) Int. Cl.
*B60L 1/00* (2006.01)
*B60R 16/03* (2006.01)
*B28C 5/42* (2006.01)
*F16H 61/4139* (2010.01)

(52) U.S. Cl.
CPC ............ *B60L 1/003* (2013.01); *B28C 5/4213* (2013.01); *B60R 16/0307* (2013.01); *F16H 61/4139* (2013.01); *Y02T 10/90* (2013.01)

(58) Field of Classification Search
CPC ................. B60R 16/03; Y02T 10/90

USPC ........................................................ 307/9.1
See application file for complete search history.

(56) References Cited

U.S. PATENT DOCUMENTS

| 4,362,390 A * | 12/1982 | Fischer ................... F03B 13/00 366/61 |
| 6,938,716 B1 * | 9/2005 | Eull ....................... B28C 5/4206 180/282 |
| 8,864,364 B2 * | 10/2014 | Zenne ...................... B60P 3/16 366/44 |
| 2007/0263478 A1 | 11/2007 | Burch |

(Continued)

FOREIGN PATENT DOCUMENTS

| JP | 52-30019 A | 3/1977 |
| JP | 10-141108 A | 5/1998 |

(Continued)

OTHER PUBLICATIONS

Office Action issued May 8, 2014, corresponds to New Zealand patent application No. 615637.

(Continued)

*Primary Examiner* — Adi Amrany
(74) *Attorney, Agent, or Firm* — Hauptman Ham, LLP

(57) ABSTRACT

A mixer drum driving apparatus having a mixer drum carried on a frame of a mixer truck to be free to rotate and a drive source configured to drive the mixer drum to rotate includes a rotary motor configured to drive the mixer drum to rotate as the drive source, a power supply configured to supply power to the rotary motor, and a power generator configured to generate power as the mixer drum rotates and charge the generated power to the power supply.

7 Claims, 4 Drawing Sheets

(56) References Cited

U.S. PATENT DOCUMENTS

| | | | |
|---|---|---|---|
| 2009/0095549 A1 | 4/2009 | Dalum et al. | |
| 2009/0322099 A1* | 12/2009 | Labankoff | F03G 3/08 290/1 R |
| 2010/0188925 A1* | 7/2010 | Huber | B28C 5/4213 366/30 |
| 2010/0226197 A1 | 9/2010 | Zenne | |
| 2010/0246314 A1* | 9/2010 | Ruf | B28C 5/4265 366/63 |
| 2013/0192351 A1* | 8/2013 | Fernald | G01F 1/7082 73/61.49 |
| 2014/0010035 A1* | 1/2014 | Takahashi | B28C 5/4217 366/61 |
| 2014/0010036 A1* | 1/2014 | Takahashi | B28C 5/4213 366/61 |
| 2014/0013736 A1* | 1/2014 | Takahashi | B28C 5/4213 60/428 |

FOREIGN PATENT DOCUMENTS

| | | |
|---|---|---|
| JP | 2003-232304 A | 8/2003 |
| JP | 2003-301802 A | 10/2003 |
| JP | 2007-278430 A | 10/2007 |
| JP | 2008006182 A * | 1/2008 |
| JP | 2010-149635 A | 7/2010 |
| JP | 2010149638 A * | 7/2010 |
| JP | 2010-228184 A | 10/2010 |

OTHER PUBLICATIONS

Office Action mailed Dec. 12, 2014, corresponding to New Zealand patent application No. 615637.

Office Action mailed Jan. 13, 2015, corresponding to Japanese patent application No. 2011-065505.

International Search Report and Written Opinion corresponding to PCT/JP2012/056238, dated Jun. 5, 2012.

* cited by examiner

MIXER DRUM DRIVING APPARATUS

RELATED APPLICATIONS

The present application is a National Phase of International Application Number PCT/JP2012/056238, filed Mar. 12, 2012, and claims priority from Japanese Application Number 2011-065505, filed Mar. 24, 2011.

TECHNICAL FIELD

The present invention relates to a mixer drum driving apparatus for a mixer truck.

BACKGROUND ART

A concrete mixer truck is a vehicle that transports fresh concrete such as mortar or ready-mixed concrete from a fresh concrete factory to a construction site in a mixer drum that is carried on a frame to be free to rotate.

To prevent the fresh concrete from decreasing in quality and hardening, the mixer drum is rotated normally as the concrete mixer truck transports the fresh concrete such that the fresh concrete is constantly agitated by a plurality of spiral blades disposed in the mixer drum. Further, the concrete mixer truck is configured such that the fresh concrete in the mixer drum can be discharged by rotating the mixer drum in an opposite direction to the normal rotation. When the concrete mixer truck arrives at a concrete pouring site, the mixer drum is rotated in reverse so that the fresh concrete is supplied to a pouring location.

In this type of concrete mixer truck, the mixer drum must be rotated constantly until the fresh concrete is discharged. An engine of the concrete mixer truck is typically used as a drive source of the mixer drum. More specifically, a rotary driving force of the engine is transmitted to a hydraulic pump via a PTO (Power Take Off), whereupon working oil discharged from the hydraulic pump is supplied to a hydraulic motor. The hydraulic motor is driven to rotate by the working oil, and the mixer drum is driven to rotate by the rotation of the hydraulic motor.

In a mixer drum driving apparatus that drives a mixer drum using only an engine, an engine rotation speed must be increased when the mixer drum is to be rotated at high speed or the like. When the engine rotation speed is increased in this manner, noise is generated and fuel consumption rises.

Further, the mixer drum must be rotated constantly for as long as the fresh concrete is carried in the mixer drum to prevent the fresh concrete from hardening and so on, meaning that the engine cannot be stopped. It is therefore necessary to continue to drive the engine even when the concrete mixer truck is stopped at the pouring site while waiting its turn to discharge the fresh concrete.

JP2007-278430A discloses a mixer drum driving apparatus that drives a mixer drum to rotate by driving an auxiliary hydraulic pump using a rotary motor in addition to a main hydraulic pump driven using an engine. In this mixer drum driving apparatus, the main pump driven by the engine is assisted by the auxiliary pump driven by the rotary motor, and therefore noise generation can be suppressed and fuel consumption can be reduced.

SUMMARY OF INVENTION

In the mixer drum driving apparatus according to the related art described above, the rotary motor is driven by supplying electric power to the rotary motor from a battery of the concrete mixer truck.

However, a large amount of power is required to drive a mixer drum carrying fresh concrete to rotate, and therefore, when only an alternator that generates power through engine rotation is used, a power generation amount deficit may occur. As a result, it may become necessary to charge the battery frequently from a commercial power supply.

It is therefore an object of this invention to provide a mixer drum driving apparatus that can drive a mixer drum to rotate using a rotary motor without the need to charge a battery frequently from a commercial power supply.

According to an aspect of the present invention, a mixer drum driving apparatus having a mixer drum carried on a frame of a mixer truck to be free to rotate and a drive source configured to drive the mixer drum to rotate includes a rotary motor configured to drive the mixer drum to rotate as the drive source, a power supply configured to supply power to the rotary motor, and a power generator configured to generate power as the mixer drum rotates and charge the generated power to the power supply.

The details as well as other features and advantages of this invention are set forth in the remainder of the specification and are shown in the accompanying drawings.

DESCRIPTION OF EMBODIMENTS

A mixer drum driving apparatus according to an embodiment of the present invention will be described with reference to the figures.

Figure 1:
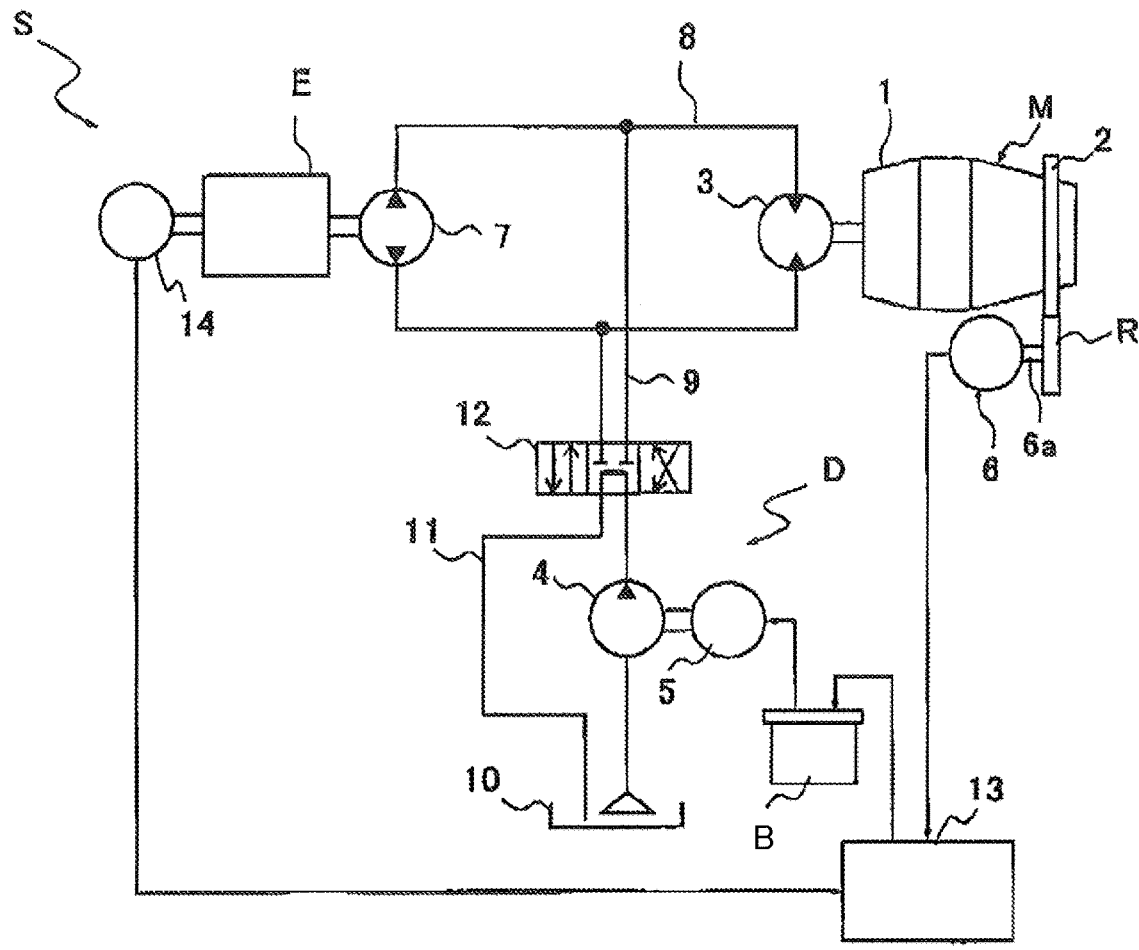
FIG. 1 is a schematic view showing a configuration of a mixer drum driving apparatus according to an embodiment of the present invention.
Figure 2:
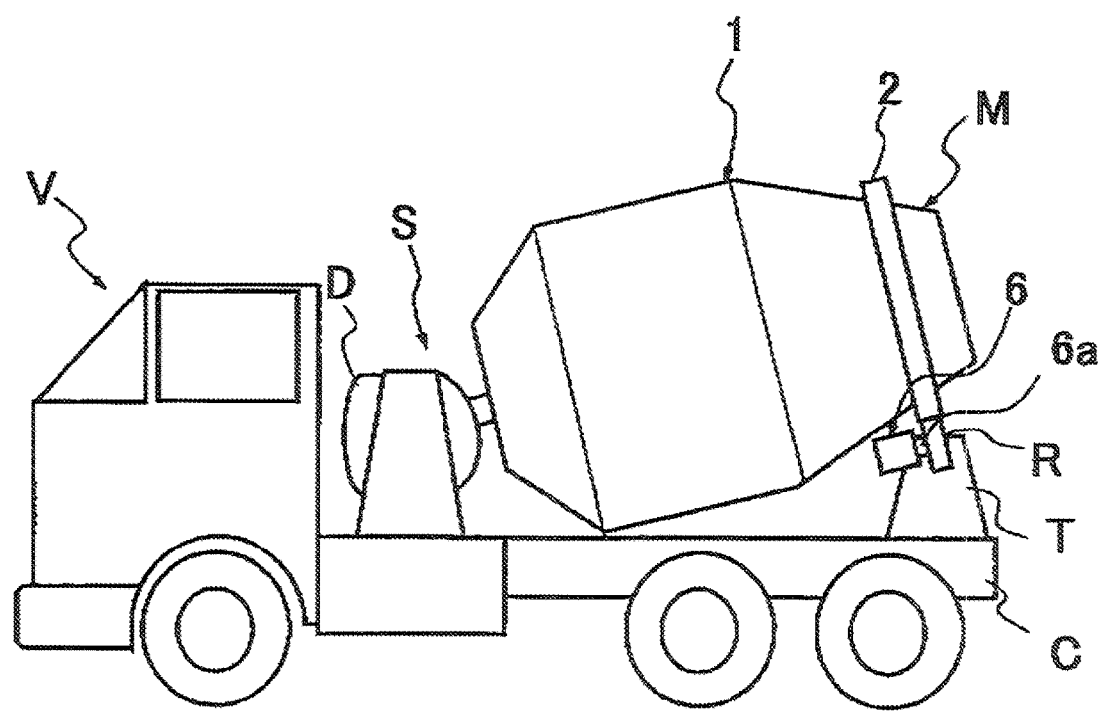
FIG. 2 is a right side view of a concrete mixer truck in which a mixer drum is carried on a frame.

As shown in FIGS. 1 and 2, a mixer drum driving apparatus S includes a mixer drum M carried on a frame C of a concrete mixer truck V to be free to rotate, and a drive source D that drives the mixer drum M to rotate.

Figure 3:
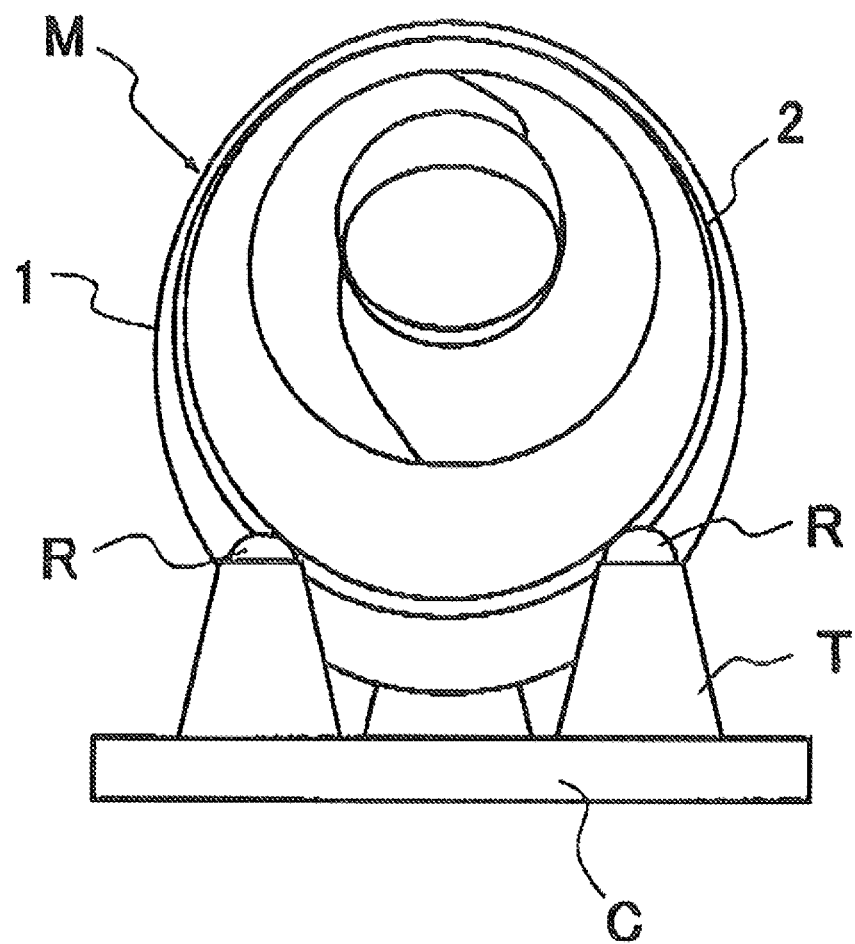
FIG. 3 is a back view of the mixer drum carried on the frame of the concrete mixer truck.

As shown in FIGS. 2 and 3, the mixer drum M and the drive source D are carried on the frame C of the concrete mixer truck V. A pair of legs T are disposed on a rear portion of the frame C of the concrete mixer truck V, and a roller R is provided on each leg T to be free to rotate.

The mixer drum M is formed in a closed-end cylinder shape having an open rear end. The mixer drum M includes a drum shell 1, an axial center portion of which is coupled to the drive source D in a bottom portion serving as a front side end, and a roller ring 2 provided on a rear side end outer periphery of the drum shell 1. The roller ring 2 is supported from a lower side on the rollers R, whereby the mixer drum M is provided on the frame C to be free to rotate. The mixer drum M is disposed on the frame C in a frontward tilted attitude such that the rear side end thereof is lifted upward.

Although not shown in the figures, a plurality of spiral blades are provided on an inner peripheral surface of the drum shell 1. When the mixer drum M is driven to rotate normally by the drive source D, the blades agitate fresh concrete in the mixer drum M while moving the fresh concrete toward the front side. When the mixer drum M is driven to rotate in reverse by the drive source D, on the other hand, the blades move the fresh concrete in the mixer drum M toward the rear side so that the fresh concrete can be discharged from the mixer drum M.

As shown in FIG. 1, the drive source D includes a hydraulic motor 3, an output shaft of which is coupled to the axial center portion of the drum shell 1 of the mixer drum M, a hydraulic pump 4 that supplies working oil to the hydraulic motor 3, a rotary motor 5 that drives the hydraulic pump 4 to rotate, a power supply B as a battery that supplies electric power to the rotary motor 5, and a power generator 6 that generates power as the mixer drum M rotates and charges the generated power to the power supply B. The concrete mixer truck V is configured such that when the hydraulic motor 3 is driven by the hydraulic pump 4, which is driven by the rotary motor 5, the mixer drum M can be driven to rotate normally or in reverse.

The drive source D further includes a main hydraulic pump 7 that is driven to rotate by an engine E of the concrete mixer truck V in order to supply working oil to the hydraulic motor 3. In the drive source D according to this embodiment, the hydraulic pump 4 can be assisted in driving the hydraulic motor 3 by the main hydraulic pump 7 driven by the engine E, and conversely, the main hydraulic pump 7 can be assisted in driving the hydraulic motor 3 by the hydraulic pump 4 driven by the rotary motor 5. Furthermore, according to the drive source D, the hydraulic motor 3 can be driven using only the hydraulic pump 4 driven by the rotary motor 5.

The hydraulic motor 3 is a hydraulic motor capable of bidirectional rotation, which is connected to the main hydraulic motor 7 via a loop-form pipe line 8. The main hydraulic pump 7 is a bidirectional discharge type hydraulic pump.

The hydraulic pump 4 is provided midway on a pipe line 9. The pipe line 9 is configured to connect one of two passages between the hydraulic motor 3 and the main hydraulic pump 7 on the pipe line 8 to a tank 10. The other passage between the hydraulic motor 3 and the main hydraulic pump 7 on the pipe line 8 is connected to the tank 10 by a pipe line 11.

The rotary motor 5 is an electric motor connected to the power supply B so as to rotate in only one direction. The hydraulic pump 4 is driven by the rotary motor 5 to suction working oil stored in the tank 10 and discharge the suctioned working oil toward the hydraulic motor 3.

A four-port, three-position direction switching valve 12 is provided midway on the pipe line 9 and the pipe line 11. The direction switching valve 12 includes a position for sending the working oil discharged from the hydraulic pump 4 to the hydraulic motor 3 in order to rotate the hydraulic motor 3 normally, a position for sending the working oil discharged from the hydraulic pump 4 to the hydraulic motor 3 in order to rotate the hydraulic motor 3 in reverse, and a position for returning the working oil discharged from the hydraulic pump 4 to the tank 10 without sending the working oil to the hydraulic motor 3.

An input shaft 6a of the power generator 6 is connected to a rotary shaft of the roller R that supports the roller ring 2 of the drum shell 1 from below. When the rollers R are rotated by the rotation of the mixer drum M, the input shaft 6a rotates, and as a result, the power generator 6 generates power. The power generator 6 is connected to the power supply B via a charging circuit 13 such that the power generated by the power generator 6 is supplied to the power supply B. As a result, the power supply B is charged. It should be noted that the power supply B is also charged by an alternator 14 that generates power as the engine E rotates.

In the mixer drum driving apparatus S described above, when the mixer drum M is driven to rotate, the input shaft 6a is driven to rotate via the roller R, with the result that the power generator 6 generates power, and the power generated by the power generator 6 is charged to the power supply B. As a result, a power generation amount for charging the power supply B is increased in comparison with a conventional mixer drum driving apparatus in which the power supply B is charged by the alternator 14 alone. Hence, according to the mixer drum driving apparatus S, the power generation amount for charging the power supply B can be increased, enabling a reduction in a frequency with which the power supply B is charged using a commercial power supply. As a result, the mixer drum M can be driven to rotate using the rotary motor 5 without the need for frequent charging from a commercial power supply.

Figure 4:
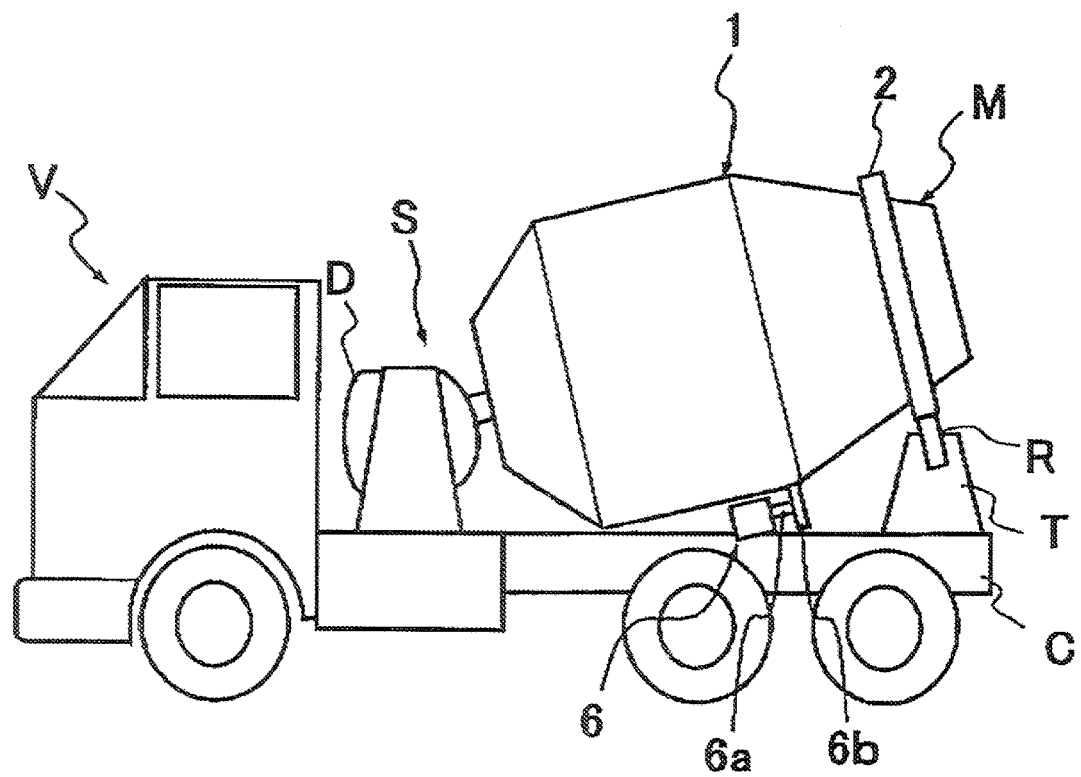
FIG. 4 is a right side view of the concrete mixer truck, illustrating a modified example of the mixer drum driving apparatus.

It is sufficient for the power generator 6 to be capable of generating power using the rotation of the mixer drum M. As shown in FIG. 4, therefore, a rotor 6b that rotates while contacting a predetermined position on an outer periphery of the mixer drum M may be disposed on the frame C, and the input shaft 6a of the power generator 6 may be coupled to the rotor 6b. When the input shaft 6a of the power generator 6 is coupled to the roller R, however, the rotor 6b is not required, and therefore a number of components can be reduced, enabling a reduction in cost. It should be noted that a transmission may be provided between the input shaft 6a of the power generator 6 and the roller 6 or between the input shaft 6a of the power generator 6 and the rotor 6b.

Furthermore, according to this embodiment, the mixer drum M can be rotated by driving the hydraulic motor 3 using the drive force of the engine E. However, in a case where the mixer drum M is rotated using the rotary motor 5 alone, the main hydraulic pump 7 may be omitted.

Although the invention has been described above with reference to a certain embodiment, the invention is not limited to the embodiment described above. Modifications and variations of the embodiment described above will occur to those skilled in the art, within the scope of the claims.

The present application claims priority based on JP2011-065505, filed with the Japan Patent Office on Mar. 24, 2011, the entire contents of which are incorporated into this specification by reference.

The invention claimed is:

1. A mixer drum driving apparatus for driving a mixer drum carried on a frame of a mixer truck to be free to rotate, the mixer drum driving apparatus comprising:
    a first hydraulic pump configured to be driven to rotate by an engine of the mixer truck;
    a hydraulic motor configured to be driven by a working fluid discharged from the first hydraulic pump, the hydraulic motor being configured to drive the mixer drum to rotate;
    a rotary motor provided separately from the engine of the mixer truck, and configured to drive the hydraulic motor;
    a power supply configured to supply power to the rotary motor;
    a power generator connected to the mixer drum so that a rotation of the mixer drum directly causes the power generator to generate power, the power generator being connected to the power supply via a charging circuit and always charging the generated power to the power supply while the mixer drum is rotating; and an alternator other than the power generator, the alternator being configured to generate power as the engine of the mixer truck rotates, and charge the power supply, wherein the power generator comprises a rotor which contacts an outer periphery of the mixer drum to be rotated by the rotation of the mixer drum, and an input shaft coupled to the rotor, and the power generator is configured to generate power when the input shaft is rotated via the rotor.

2. The mixer drum driving apparatus as defined in claim 1, further comprising:

a second hydraulic pump configured to be driven to rotate by the rotary motor;

wherein the hydraulic motor is further configured to be driven by a working fluid discharged from the second hydraulic pump.

3. The mixer drum driving apparatus as defined in claim 1, further comprising:

a transmission provided between the input shaft of the power generator and the rotor.

4. A mixer truck, comprising:

a frame;

a mixer drum supported on the frame to be free to rotate;

a first hydraulic pump configured to be driven to rotate by an engine of the mixer truck;

a hydraulic motor configured to be driven by a working fluid discharged from the first hydraulic pump, the hydraulic motor being configured to drive the mixer drum to rotate;

a rotary motor provided separately from the engine of the mixer truck, and configured to drive the hydraulic motor;

a power supply configured to supply power to the rotary motor;

a power generator connected to the mixer drum so that a rotation of the mixer drum directly causes the power generator to generate power, the power generator being connected to the power supply via a charging circuit and always charging the generated power to the power supply while the mixer drum is rotating; and an alternator other than the power generator, the alternator being configured to generate power as the engine of the mixer truck rotates, and charge the power supply, wherein the power generator comprises:

a rotor which contacts an outer periphery of the mixer drum to be rotated by the rotation of the mixer drum; and an input shaft coupled to the rotor, and the power generator is configured to generate power when the input shaft is rotated via the rotor.

5. The mixer truck as defined in claim 4, further comprising:

a second hydraulic pump configured to be driven to rotate by the rotary motor;

wherein the hydraulic motor is further configured to be driven by a working fluid discharged from the second hydraulic pump.

6. The mixer truck as defined in claim 4, further comprising:

a transmission provided between the input shaft of the power generator and the rotor.

7. The mixer truck as defined in claim 6, wherein the rotor is disposed on the frame.

* * * * *